United States Patent
Pauli et al.

(10) Patent No.: US 6,402,459 B1
(45) Date of Patent: Jun. 11, 2002

(54) DEVICE COMPRISING AN ELONGATED TUBULAR BODY ARRANGED TO BE LOCATED IN WATER

(76) Inventors: Mikael Pauli, Tändkulevägen 16, Nacka Strand 131 52 (SE); Dag Birkeland, Slipgatan 3,1 tr, Stockholm 117 39 (SE)

( * ) Notice: Subject to any disclaimer, the term of this patent is extended or adjusted under 35 U.S.C. 154(b) by 0 days.

(21) Appl. No.: 09/646,265
(22) PCT Filed: Mar. 12, 1999
(86) PCT No.: PCT/SE99/00385
§ 371 (c)(1),
(2), (4) Date: Sep. 13, 2000
(87) PCT Pub. No.: WO99/46502
PCT Pub. Date: Sep. 16, 1999

(30) Foreign Application Priority Data

Mar. 13, 1998 (SE) ............................................... 9800833

(51) Int. Cl.[7] ........................... F03B 13/12; B63B 45/00
(52) U.S. Cl. ............................ 415/3.1; 415/7; 417/100; 441/13; 239/18; 239/22
(58) Field of Search .............................. 415/3.1, 7, 202; 416/85, 86; 239/99, 101, 16, 18, 22, 23; 417/330, 334, 100, 331; 441/13

(56) References Cited

U.S. PATENT DOCUMENTS

| 3,064,137 A | 1/1962 | Corbetter, Jr. et al. ........ 290/53 |
| 3,922,739 A | 12/1975 | Babintsev ...................... 9/8 R |
| 4,286,347 A | 9/1981 | Modisette ...................... 9/8 R |
| 4,603,551 A | 8/1986 | Wood ........................... 60/496 |
| 4,719,754 A | 1/1988 | Nishikawa .................... 60/501 |

*Primary Examiner*—F. Daniel Lopez
*Assistant Examiner*—Kimya N McCoy
(74) *Attorney, Agent, or Firm*—Hovey Williams LLP

(57) ABSTRACT

The invention relates to a device (1), including an elongated tubular body (3) arranged to be located in water in an essentially vertical position. The tubular body (3) includes an open end (6) at the bottom and a narrowing portion (7) at the top, which ends in an opening (8) arranged to be located above the level of the surrounding water (2). The device (1) is arranged to establish a water level in the narrowing portion (7) of the tubular body (3), which is lower than the level of the surrounding water and to intermittently level out this level difference in such a way that the water in the tubular body (3) is transported up to a higher level than the level of the surrounding water by the action thereon of the narrowing portion (7).

17 Claims, 7 Drawing Sheets

US 6,402,459 B1

DEVICE COMPRISING AN ELONGATED TUBULAR BODY ARRANGED TO BE LOCATED IN WATER

BACKGROUND OF THE INVENTION

1. Field of the Invention

The present invention relates to a device comprising an elongated tubular body arranged to be located in water in an essentially vertical position, wherein the tubular body at the bottom comprises an open end and at the top a narrowing portion, which ends in an opening arranged to be located above the level of the surrounding water.

2. Description of the Prior Art

From U.S. Pat. No. 3,064,137 a floatable device is known, which comprises a tube with an internal water level, which is brought to move upwards and downwards in the tube by means of the waves of the surrounding water. Thereby, the air located above the water level in the tube will stream out and in through an opening provided at the top of the tube. In this case, a turbine and a generator are provided to gain power, which is generated by the movement of this air stream.

From U.S. Pat. No. 4,603,551 a buoy is previously known, which moves up and down in a floating elongated structure. By this movement, water is pumped by means of a piston and a cylinder, via valves, into a space, where it drives a water turbine and an electric generator.

The object of the above mentioned devices is to generate energy which may be gained by motions of waves.

Lighthouses comprising a lighting device usually mark out grounds at sea. In order to make these lighthouses effectual, it is required that these lighting devices are provided at such a level that they are not blocked by waves in heavy sea. Such lighthouses must have a sufficient height and be stable in order to withstand rough weather and therefore they are expensive to build.

Such lightening houses must have a sufficient height and be stable in order to withstand rough weather and therefore they are expensive to build.

SUMMARY OF THE INVENTION

The object of the present invention is to provide a device which is arranged to force, in an effective way, a water quantity, in the form of, e.g. a water jet, upwards from a water volume and especially in order to be able to mark and draw attention to objects of various kinds. This may be used in many fields of application. One such field is marking of grounds and other objects, which have to be observed at sea.

This object is achieved according to the invention with the initially defined device, which is arranged to establish a water level in the narrowing portion of the tubular body, which is lower than the level of the surrounding water and to level out intermittently this level difference in such a way that the water in the tubular body is transported up to a higher level than the level of the surrounding water by means of the narrowing portion. By a suitable dimensioning of the narrowing portion and its opening such a water jet may be ejected to a considerable height and highly above any existing crest of waves. Thereby, a marked ground may e.g. be visible from a long distance and a lot of time is given for ships to steer away from the ground. By an elongated water jet, the distance to a marking may also be better estimated than in the case that it is marked out by a point-shaped lighting device.

According to a preferred embodiment of the invention, a valve device is provided at the opening of the tubular body, which valve device is arranged to open when a determined overpressure is obtained within the tubular body. Thereby, when a sufficient level difference is established between the water in the tube and the level of the surrounding water, an upwards ejecting water jet is obtained.

According to a preferred embodiment of the invention, such a valve device may also be arranged, in case of subpressure in the tubular body, to allow an inflow of air into the tubular body, If the device with the tubular body is provided to be movable, it may thereby by its movement "pump" up an internal pressure in such a way that said level difference is established. This movement may be generated by the fact that it is arranged to be floating in water, wherein said level difference is established by the fact that it moves essentially upwards and downwards in an essentially vertical direction by means of existing waves At a sufficient height of the waves, a water jet may be ejected essentially once a wave. This will occur by the fact that the floating device is arranged, in its direction downwards from the crest of a wave by means of the narrowing portion of the tubular body, to transport substantially the water contained in the tubular body. Which means, when the device, in a trough of a wave, returns to move upwards, that the water in the tubular body still flows downwards due to the kinetic energy of the water. By the fact that the tubular body at the bottom comprises an essentially larger cross section area than the narrowing portion in the vicinity of the opening, the water needs only to continue to stream downwards out of the tubular body a short distance for obtaining a heavy dropping of the level in the narrowing portion. Thereafter, a following pressure levelling leads to a rapid upwards directed water flow in the narrowing portion of the tubular body so that a water jet ejects upwards out of the opening. According to a test with a prototype, this water jet was obtained immediately before the floating device reaches a crest of a wave.

According to another preferred embodiment of the invention, the floating device comprises a weight body. By the weight of the weight body, the narrowing portion of the tubular body may transport the water contained in the tubular body downwards so that said level difference is established between the water contained in the tube and the surrounding water. The weight body also has the purpose to work as counterweight when the water is forced upwards through the narrowing portion. Said weight body may comprise a space, which is arranged to be filled with water. Thereby, a device is obtained with a considerable weight but the device itself does not need to be heavy. This is very favourable in view of the expenses. Suitably, said water-filled space may be provided externally around the narrowing portion. Thereby, a symmetrical downwards working weight is obtained, at the same time as the floating device may be constructed as a simply constructed symmetric unit. In order to prevent the water in said space from being filled over a suitable level, by e.g. ripples or rain, said space may comprise a passage, which allows a water flow between said space and the surrounding water. However, this passage is so small that the water level in the weight body does not immediately adapt to the level of the surrounding water. When the floating device is at crests and troughs of waves the water level of the weight body may be higher and lower, respectively, than the level of the surrounding water.

According to a further preferred embodiment of the invention, the floating device comprises floating elements, which are provided at the upper end of the tubular body. Thereby the elongated tubular body is kept floating in the water in an essentially vertical position. Preferably, in this case the floating element has a downwards directed conical shape so that the movement downwards of the floating device in a trough of a wave is not immediately slowed down but the device may Continue downwards in the water a short distance before it returns upwards by the next wave. Thereby, the water contained in the tubular body is also forced down said distance, whereby the desired level difference may be greater. A floating element located below its natural floating position moves rapidly upwards, which also favour the formation of said level difference. Consequently, the conical angle downwards of the floating body is very important for the function of the device.

According to an alternative embodiment of the invention, the device is anchored, wherein said level difference of the water in the tubular body and the surrounding water is established by the supply of air to the interior of tubular body. Such a construction of the device, where it is essentially stationary in relation to the surrounding water, may be suitable in calm waters and where a power source is available. In this case, e.g. a motor may drive a compressor, which via a conduit supplies air to the interior of the tubular body. When a sufficient quantity of water is pressed downwards by the supplied air, so that a sufficient pressure within the tubular body is obtained, said valve device will open, wherein an upwards directed water jet is obtained.

According to an advantageous embodiment of the invention, said narrowing portion of the tubular body comprises a conical shape. The narrowing portion may be shaped as a circular right-angled cone having a radius, which decreases continuously along a straight line until it ends in the opening, which is centrally located at the top of the tubular body. Another alternative is that the radius of the narrowing portion decreases along a curve, which is bent inwards against the centre of the narrowing portion. In this case, the radius may decrease progressively. By this shape of the narrowing portion, a higher water jet is generally formed than in the case with the narrowing portion, which is shaped as a circular right-angled cone.

According to another preferred embodiment of the invention a lighting device is provided on the device and directed so that it illuminates said water jet. By the fact that the water jet forms a relatively clear optical body the light from the lighting device will be spread in the whole water jet. This light effect will still attract further attention, whereby e.g. a ground may be observed and the distance estimated in a very good time, in this case, the lighting device may only be activated when said water jet ejects upwards. Another alternative may be that the lighting device is activated during determined intervals. It works usually since a water jet in any form is nearly the whole time present in the air. Thereby, the requirement of energy for the lighting device may be kept at a low level. In order to obtain energy to the lighting device, solar cells may be provided on the floating device. Thereby, the solar cells are arranged to generate electric energy, which is accumulated in batteries provided on a suitable place on the floating device.

According to another preferred embodiment, air or water flowing out from the opening may be arranged to drive a turbine for generating energy, Since the floating device in a very effective way transforms the kinetic energy of the waves to an upwards raising water level in the narrowing portion, the possibility to use the device for generating energy is offered.

BRIEF DESCRIPTION Of THE DRAWINGS

In the following preferred embodiments of the invention are described as examples with reference to the attached drawings, in which.

DETAILED DESCRIPTION OF PREFERRED EMBODIMENTS OF THE INVENTION

Figure 1:
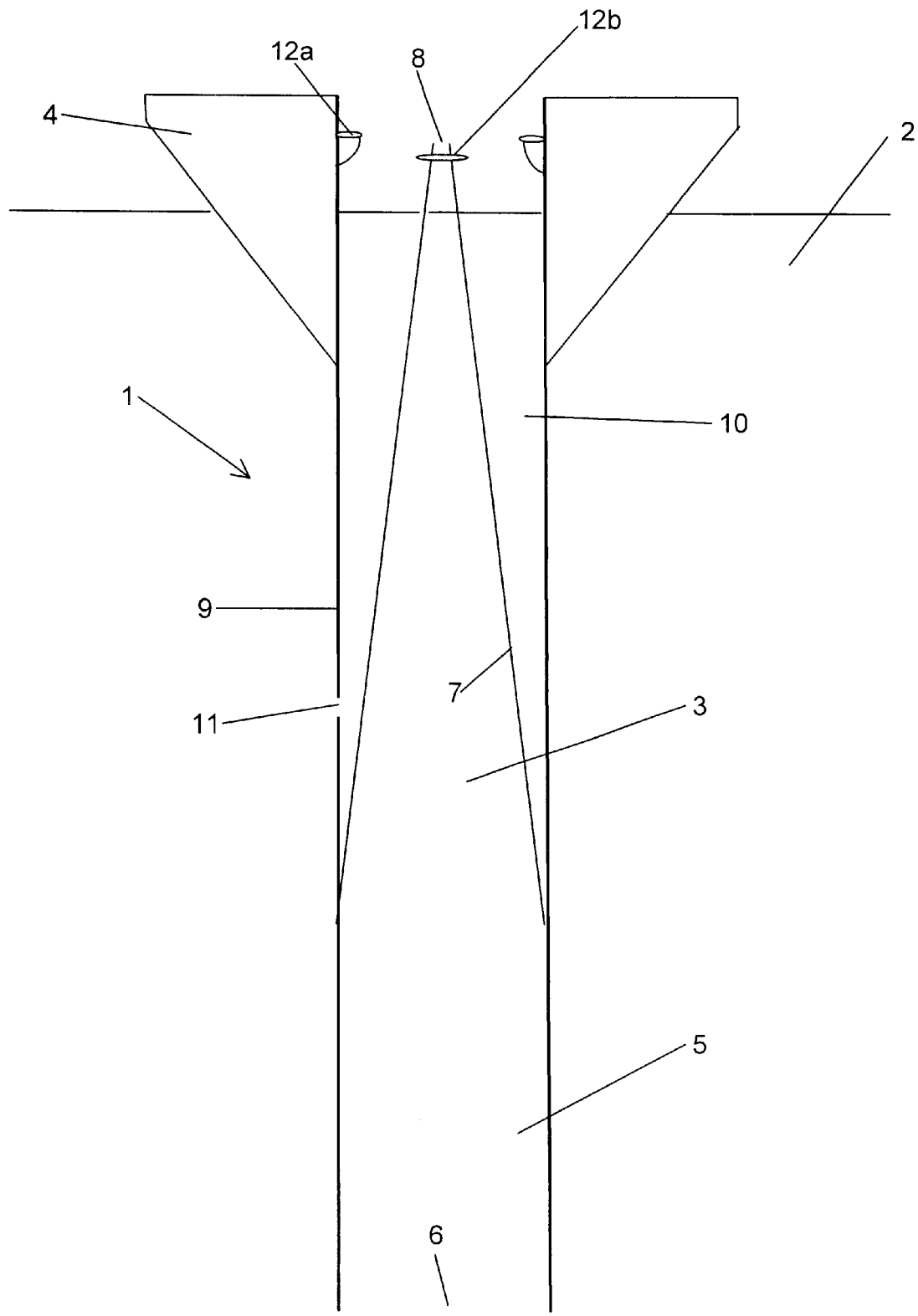
FIG. 1 shows a longitudinal section through a floating device according to the invention.

FIG. 1 shows a longitudinal section of a device 1 according to the invention, which is provided to be floating in water 2. The floating device 1 comprises an elongated tubular body 3, which is kept floating in the water by means of a floating element 4 provided at the upper end of the tubular body 3, so that the tubular body 3 is kept in an essentially vertical position in the water. The floating element 4 has a conical portion directed downwards. The tubular body 3 comprises a lower part 5 having a circular essentially constant cross-section. The lower part 5 comprises at the bottom an open end 6. The tubular body 3 comprises an upper part 7 connected to the lower part 5. The upper part 7 is narrowing and forms a cone with an upper opening 8. The device 1 is constructed of an elongated circular tube 9 extending along the whole longitudinal direction of the device 1. Thereby, the tube 9 forms the lower part 5 of the tubular body 3 and encloses the upper part 7 of the tubular body 3, wherein a space 10 is formed therebetween. The upper end of the tube 9 is externally enclosed by the floating element 4. The tube 9 comprises a passage 11 so that the space 10 is not filled with water up to a too high level by e.g. ripples or rainwater. The water in the space 10 works as a weight body, which is arranged to increase the weight of the device 1. The tube 9 comprises at the top a lighting device 12a and diode lamps 12b, which are directed to light upwards above the opening 8 of the tubular body 3 in such a way that a water jet 13 ejecting upwards from the opening 8 is illuminated. Thereby, the light may be spread in the water jet so that it is illuminated like a unit. The lighting device 12a may comprise lights in different colours e.g. green and red light may be used for guiding ships. The lighting device 12a may be arranged to be lit when a powerful water jet ejects upwards from the opening 8 whereas the diode lamps may be arranged to illuminate smaller water jets. The floating device 1 is arranged to be moved essentially upwards and downwards in a vertical direction by means of the waves existing in the water 2, wherein the device 1 is arranged to eject intermittently a water jet 13 out of the opening 8 of the tubular body 3 essentially once a wave by means of said wave motion.

Figure 2:
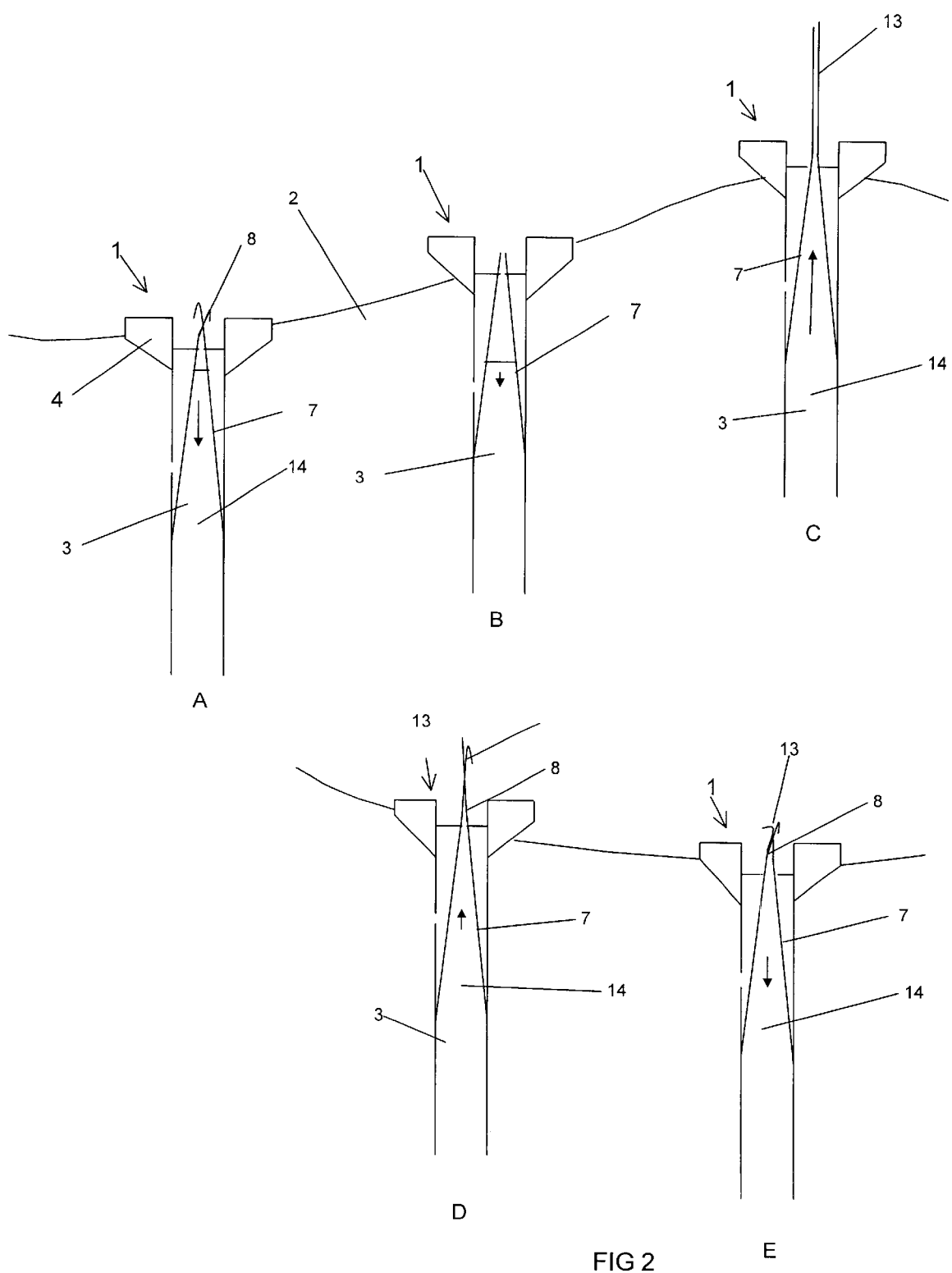
FIGS. 2a–2e shows the floating device at different positions of a wave.

FIG. 2 shows the device 1 in different positions A–E along a wave motion. In position A, the device 1 is on the way up from a trough of the wave by means of the floating element 4. In this case, the device 1 has transported the water 14 contained in the tubular body 3 during its direction downwards by means of its weight and the narrowing portion 7, which thereby is brought to stream downwards with the tubular body 3. Consequently, the device 1 has in position A returned upwards with the wave while the water in the tubular body continues to stream downwards. Thereby, a level difference arises between the water contained in the narrowing part 7 of the tubular body 3 and the level of the surrounding water 2. By the fact that the narrowing portion 7 at the top shows an essentially smaller cross-section area than the tubular body 3 at the bottom, the water streaming out at the bottom of the tubular body 3 needs not to move downwards an especially long distance before a considerable water level drop will arise at the top of the narrowing portion 7. In position B the device 1 continues upwards by means of the movement of the wave. The movement downwards of the water 14 contained in the tubular body 3 has nearly stopped and a considerable level difference between the level of the water 14 contained and the level of the surrounding water 2 has been established. Consequently, by the narrowing shape of the upper portion 7 this level difference may be considerable and in favourable cases take up nearly the whole length of the narrowing portion 7. This level difference between the water 14 contained in the tubular body 3 and the surrounding water 2 result in a following levelling of the pressure so that a rapidly upwards directed water flow 14 in the tubular body 3 is obtained, wherein the movement upwards of the water is accelerated by means of the narrowing portion 7 so that a water jet 3 having a very high velocity ejects out of the opening 8. This powerful water jet 13 is obtained, according to performed tests, immediately before the floating device 1 reaches a crest of a wave, which is shown in position C. In this position the tubular body 3 is at its highest position in relation to the surrounding water 2 and the water level of the weight body 10 is also slightly above the level of the surrounding water 2. The weight body 10 works, in this case, as a counterweight against the upwards ejecting water jet 13. During the following movement downwards, the weight body 10 uses its weight to get the contained water 14 to move downwards. At position D, the contained water 14 has still a small velocity upwards in relation tot he downwards movement of the tubular body 3 so that a water jet 13 with a relative low velocity leaves the opening 8. During the continuing way downwards of the floating device 1 towards the trough of the wave at position E, the floating device 1 has by its weight and its narrowing upper portion 7 brought the streaming of the water 14 in the tubular body 3 to return downwards. A water flow streams at position E still out of the opening 8. By the downwards directed conical portion of the floating element 4 it is obtained that the device 1 is not immediately stopped in the trough of a wave but sinks down an additional distance in the water before it returns. Thereby the device brings a movement directed rapidly upwards by its buoyancy, which favours the formation of the desired level difference. Thereafter, the process continues by a following wave with the device 1 in the position A.

Figure 3:
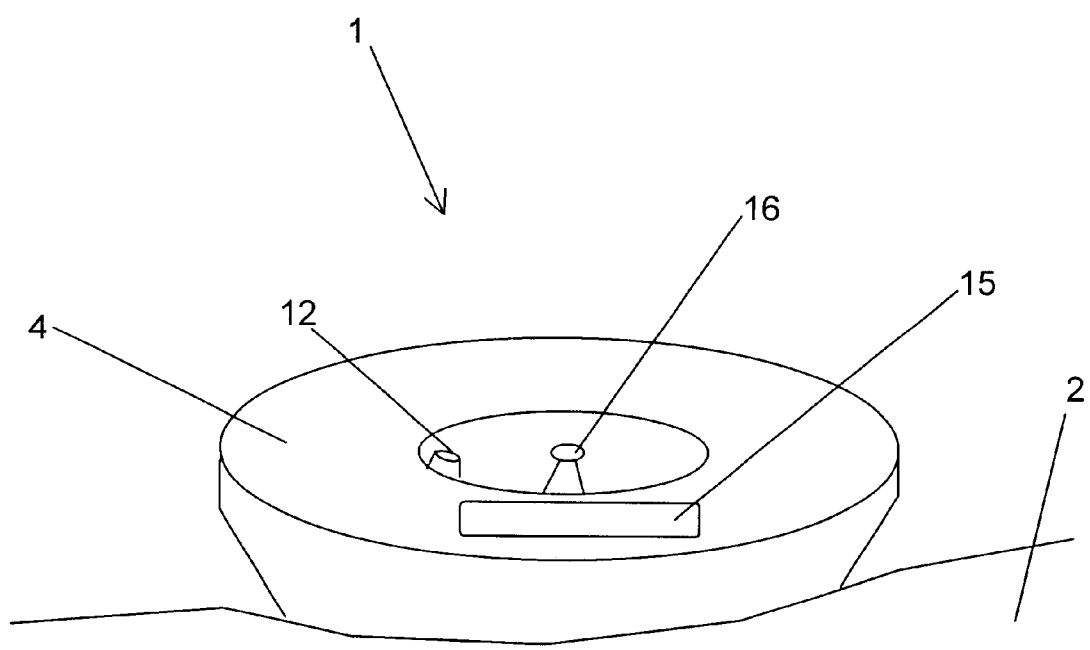
FIG. 3 shows a view obliquely from above of the floating device in water.

FIG. 3 shows a device 1 in water seen in a view obliquely from above. Hereby it is evident that only a small part of the device is visible above the surrounding water 2. This part consists mainly of a floating element 4, which extends annularly around the upper part of the tube 9. The floating element 4 may consist of a homogenous material being floatable by itself or comprise cavities with air in order to obtain the floating ability. On the upper side of the floating element 4, solar cells 15 are provided for producing electric energy for driving the lighting device 12. In this case, the device 1 comprises a valve device 16, which is provided at the opening 8 of the tubular body. This valve device 1 comprises a value device 16, which is provided at the opening 8 of the tubular body. This valve device 16 is arranged to open when a determined overpressure is obtained within the tubular body 3. The valve device 16 is also arranged in case of a subpressure in the tubular body to allow an air inflow. Thereby, the tubular body 3 will during its movement upwards and downwards with the surrounding waves, gradually increase its inner pressure until a determined overpressure is obtained, whereby a powerful water jet ejects upwards through the opening 8. Such a construction of the device may be suitable at places having a small wave height where the energy of one wave is not enough to establish a pressure difference which is sufficient to create said powerful water jet.

Figure 4:
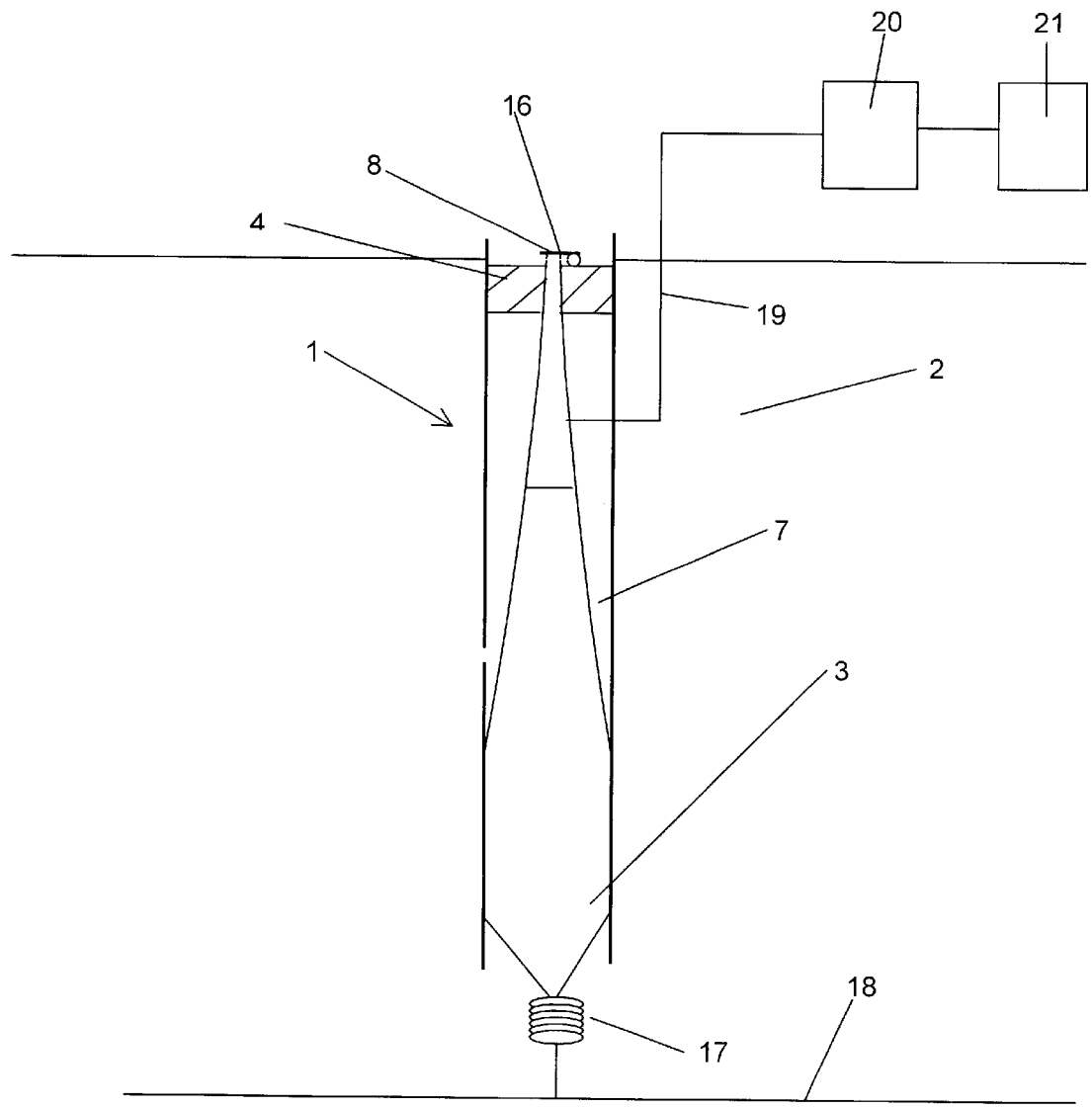
FIG. 4 shows an alternative embodiment of the invention.

FIG. 4 shows an alternative embodiment of the invention. In this case, the radius of the narrowing portion 7 decrease progressively along a curve, which is bent inwardly towards the central of the narrowing portion. By this curve, the water generally obtains a higher water jet than with a narrowing portion having a straight-lined conical shape when it is pressed upwards through the narrowing portion. The tubular body 3 is at the bottom fixedly provided in the water by means of a resilient anchorage member 17 at the bottom 18 of the water. The opening 8 of the tubular body 3 with valve device 16 is provided immediately above the water surface. A level difference between the water level in the tubular body 3 and the level of the surrounding water 2 is established by the supply of air to the tubular body 3 through a conduit 19. The air is supplied by means of a compressor 20, which is located above the water surface and driven by a motor 21. Such a construction of the device 1 may be suitable in calm water and close to land where there is a power source available. Consequently, the compressor 20 compresses the air which is led, via the conduit 19, to the tubular body 3, wherein the pressure therein increases by the quantity of supplied air at the same time as the water level of the tubular body is dropped. By an increasing quantity of enclosed air, the tubular body moves upwards and stretches the resilient anchoring member 17. This goes on until a determined pressure is established when the value device 16 is arranged to open, wherein the air enclosed in the tubular body 3 is pressed out through the opening 8. By the following rapid levelling of the pressure, the internal water level may rapidly rise and by means of the narrowing portion 7 bring such a velocity that it forms a powerful water jet 13 ejecting out of the opening 8. By the fact that the resilient anchorage member 17 when the air streams out displaces the tubular body downwards, the velocity of this water jet is additionally increased. Thereafter the valve device 16 closes so that a new overpressure may be established in the tubular body 3.

Figure 5:
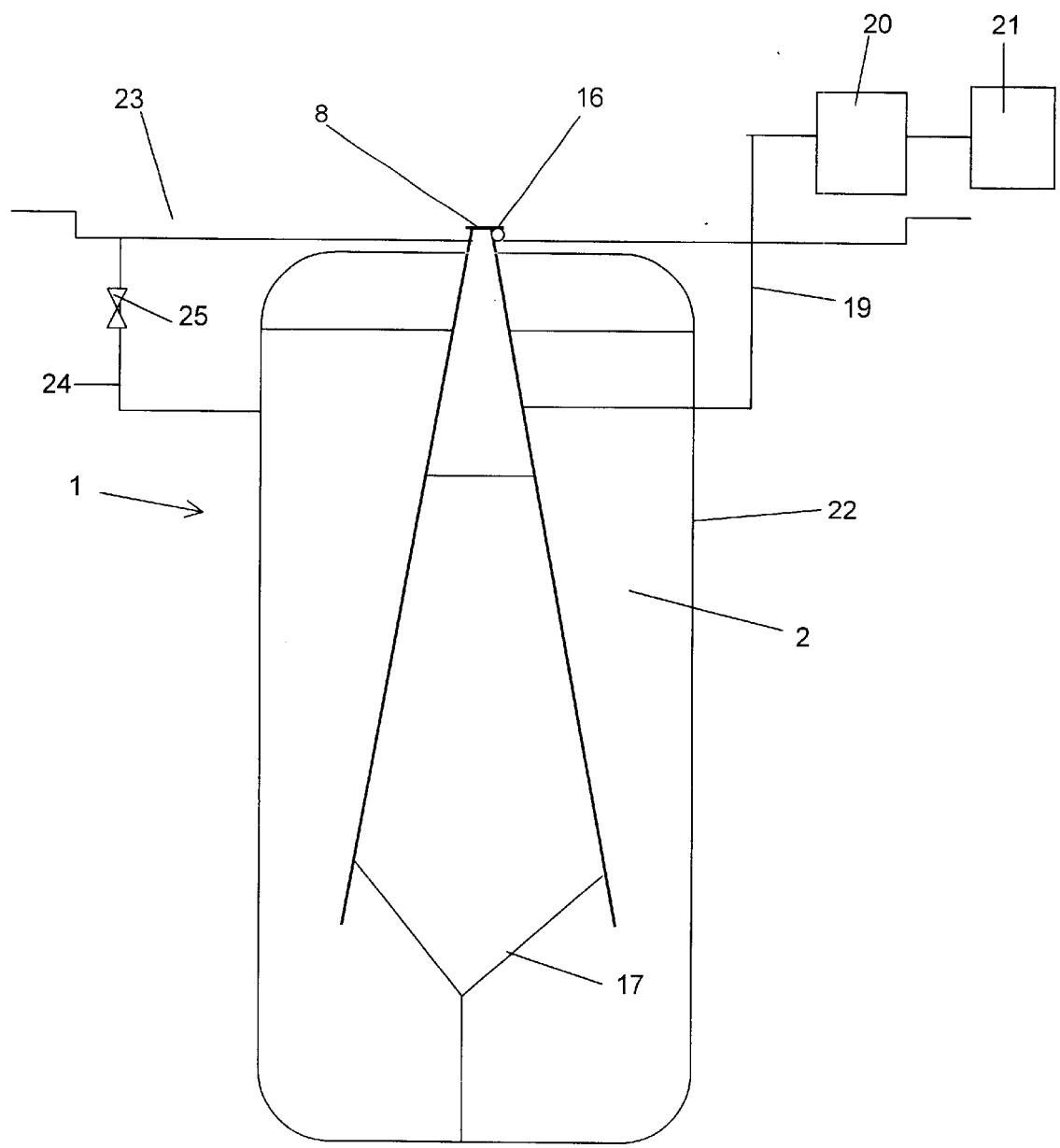
FIG. 5 shows a further embodiment of the invention.

FIG. 5 shows another embodiment of the invention, with the difference from the embodiment in FIG. 4, that the tubular body 3 in this case is completely conical, fixedly anchored 17 and placed in a closed container 22 with water. Ejected water is collected In a basin 23 and conducted back to the container 22 through the conduit 23 via an automatically controlled valve 24. Such an embodiment is most suitable as a fountain.

Figure 6:
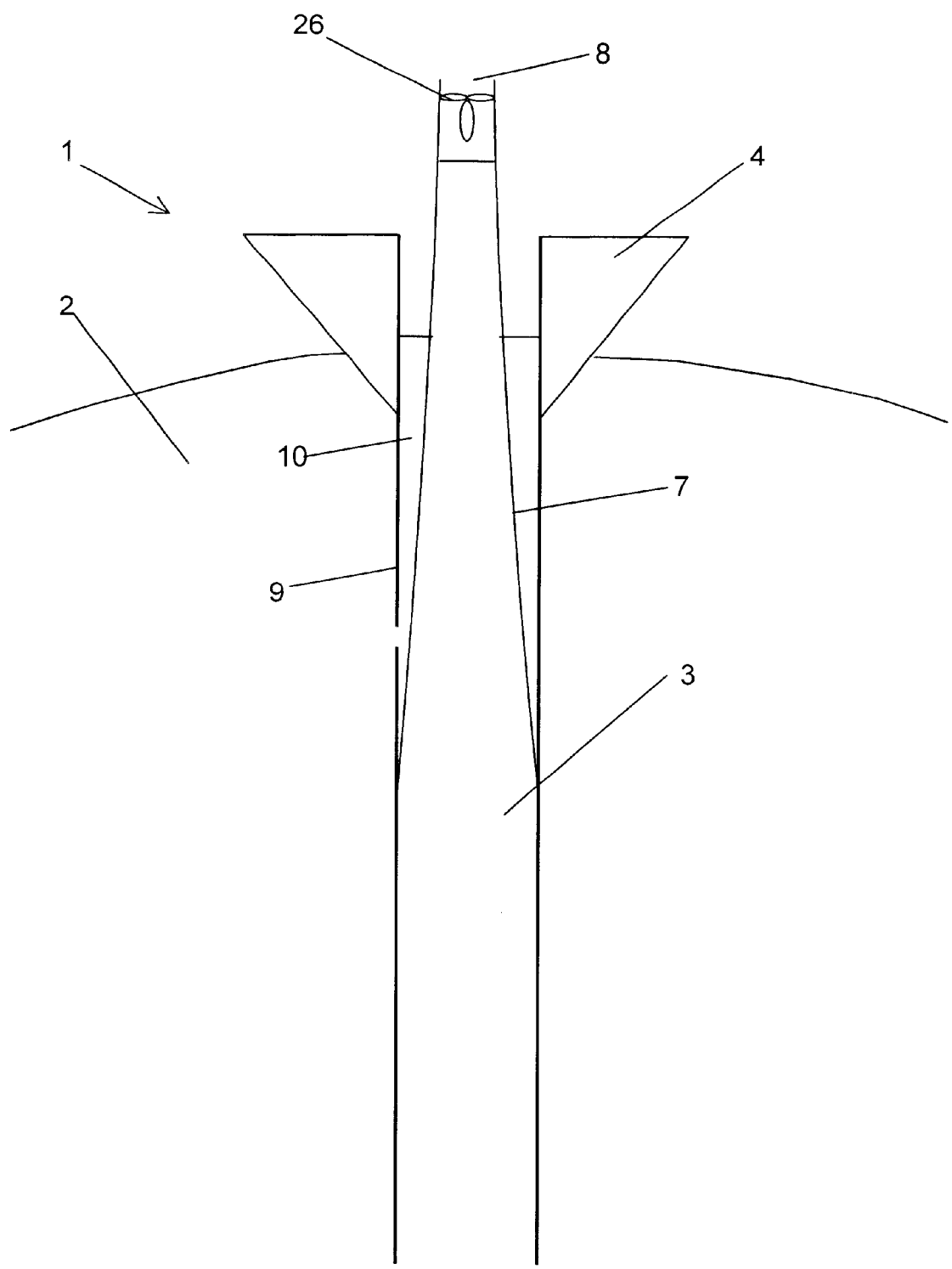
FIG. 6 shows another further embodiment of the invention.

FIG. 6 shows another embodiment of the invention, which is showed on a crest of a wave. This embodiment differs from the above described embodiments in that the narrowing portion 7 is broader and ends in a greater opening 8 located on a relatively high level above the level of the surrounding water 2. Furthermore, the device 1 comprises a turbine 26 which is arranged to be driven by the air streaming out from the opening 8, which is forced upwards by the rapidly raising water level in the narrowing portion 7. The turbine 26 may be connected to a generator in order to obtain electric energy. An alternative to this embodiment may be to place the turbine lower or make the narrowing portion 7 more narrow so that water in the narrowing portion 7 brings such a velocity that it passes and thereby drive the turbine.

Figure 7A:
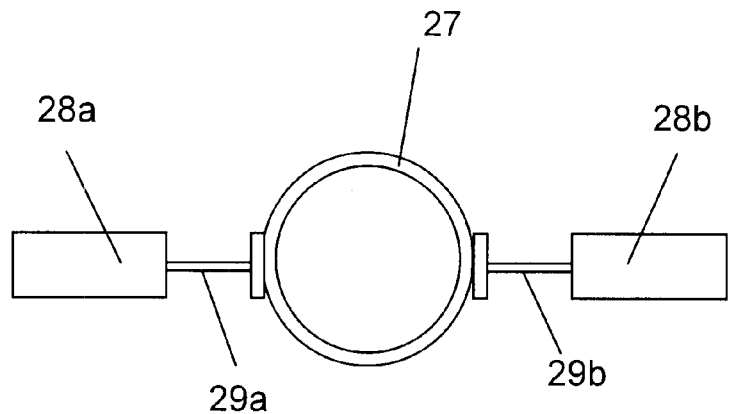
FIGS. 7a–c shows a nozzle having a variable shape. which is arranged to be provided at the opening of the tubular body.
Figure 7B:
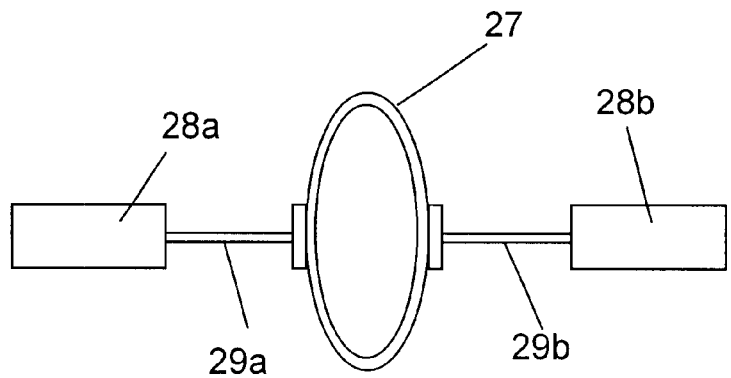
Figure 7C:
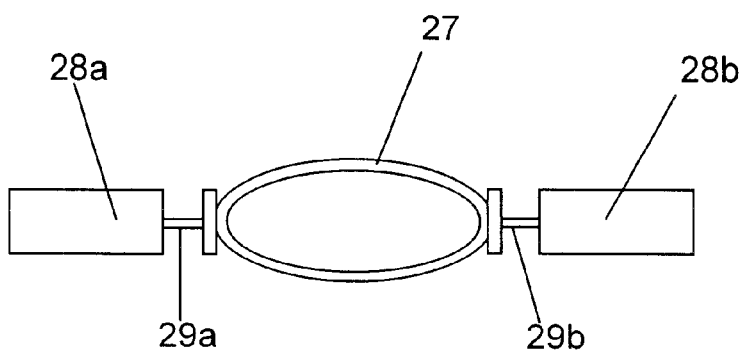

FIGS. 7a–c show a nozzle 27, which is applicable at the opening 8 of the tubular body 3. The nozzle 27 consists of a flexible material, e.g., rubber, which extends around the opening 8. In order to vary the shape of the nozzle 27, two cylinders 28a, b are provided on opposite sides of the nozzle 27. The cylinders 28a, b comprise displaceable rod pistons 29a, b, which ends are connected to the nozzle 27. By displacing the rod pistons 29a, b in a sufficient way, the shape of the nozzle 27 may be varied, e.g. in that way as shown in FIGS. 7a–c. By varying the shape of the nozzle 27 at the same time as the water is forced upwards in the tubular body 3, the possibility arises to form the water pillar ejecting from the opening 8 in such a way that it will show a lot of decorative shapes which attract attention. Advantageously, the shape of the nozzle 27 is varied by means of rapid movements of the cylinders 28a, b so that the water essentially continuously obtains a varying pressure during its passage through the nozzle 27. Thereby, the water pillar will obtain different velocities along its extension, which makes the forming of said decorative shapes possible.

By a prototype of a floating device 1, which essentially corresponds to the embodiment according to the FIGS. 1 and 2, it was comprising a tube 9 having a length of 6 meters and a diameter of 50 centimetres and the narrowing portion 7 had a length of 2.5 meters and the opening 8 a diameter of 5 centimetres. By this prototype, a water jet with a height of 16 meters was obtained and an initial velocity of 90 km/h out from the opening 8 during a wave height of about 80 centimetres. Consequently, a water jet with such a floating device may eject upwards a distance which essentially corresponds to 20 times the wave height.

Advantageously, the invention may be used to mark out grounds but also other applications are possible such as to mark out, e.g. channels and shipping-lanes. Certainly, the invention may also be used for a solely decorative purpose and for drawing attention to commercial objects of various kinds and to be used as fountain, ecological firework and toy. Also other applications are possible such as to gain wave energy and to supply oxygen to water. The floating device may also be provided in different kinds of groups so that several water jets are provided at the same time or in a determined sequence and with different lighting colours. By placing a device creating a tune over the opening 8 of the tubular body 3 a sound may also be generated when the enclosed air is pressed out through the opening.

The progressively narrowing conical shape of the narrowing portion shown in FIG. 4 may also be applied to the embodiments in the other figures.

The invention is not restricted to the embodiments shown in the figures, but may be varied freely within the scope of the claims.

What is claimed is:

1. A device comprising an elongated tubular body arranged to be located in water in an essentially vertical position, wherein the tubular body at the bottom comprises an open end and at the top a narrowing portion which ends in an opening arranged to be located above the level of the surrounding water wherein the device is arranged to establish a water level in the narrowing portion of the tubular body, which is lower than the level of the surrounding water and to level out intermittently this level difference in such a way that the water in the tubular body by means of the narrowing portion is transported up to a higher level than the level of the surrounding water.

2. A device according to claim 1, wherein a water jet is arranged to be ejected intermittently out of the opening of the tubular body.

3. A device according to claim 1, including a valve device which is provided at the opening of the tubular body, which valve device is arranged to open when a determined overpressure is obtained within the tubular body.

4. A device according to claim 3, wherein the valve device is arranged to allow an air inflow in case of a subpressure in the tubular body.

5. A device according to claim 1, wherein the device is arranged to be floating in water, wherein said level difference is established by the provision that the device is arranged to move essentially upwards and downwards by means of existing waves in an essentially vertical direction.

6. A device according to claim 5, wherein the floating device is arranged, in its direction downwards by means of the narrowing portion of the tubular body, to transport substantially the water contained in the tubular body, which means that when the device returns to move upwards, the water still flows downwards in the tubular body in such a way that a level difference is achieved between the water contained in the tubular body and the surrounding water.

7. A device according to claim 5, wherein the device comprises a weight body.

8. A device according to claim 7, wherein said weight body comprises a space, which is arranged to be filled with water.

9. A device according to claim 8, wherein said space filled with water is externally around the narrowing portion.

10. A device according to claim 8, wherein said space comprises a passage, which allows a water flow between said space and the surrounding water.

11. A device according to claim 5, wherein a floating element is provided at the upper end of the tubular body.

12. A device according to claim 3, wherein the device is anchored, and wherein said level difference is established by the supply of air into an inner space of the tubular body.

13. A device according to claim 1, wherein said narrowing portion comprises a conical shape.

14. A device according to claim 2, wherein a lighting device is provided on the device and directed so that it illuminates said water jet.

15. A device according to claim 14, wherein said lighting device is provided to be activated, only when said water jet is ejected.

16. A device according to claim 14, including solar cells.

17. A device according to claim 5 further including a turbine, and wherein air or water flowing out from the opening is arranged to drive the turbine to generate energy.

* * * * *